J. R. WELCH.
WHEEL.
APPLICATION FILED SEPT. 26, 1908.
1,100,800.
Patented June 23, 1914.
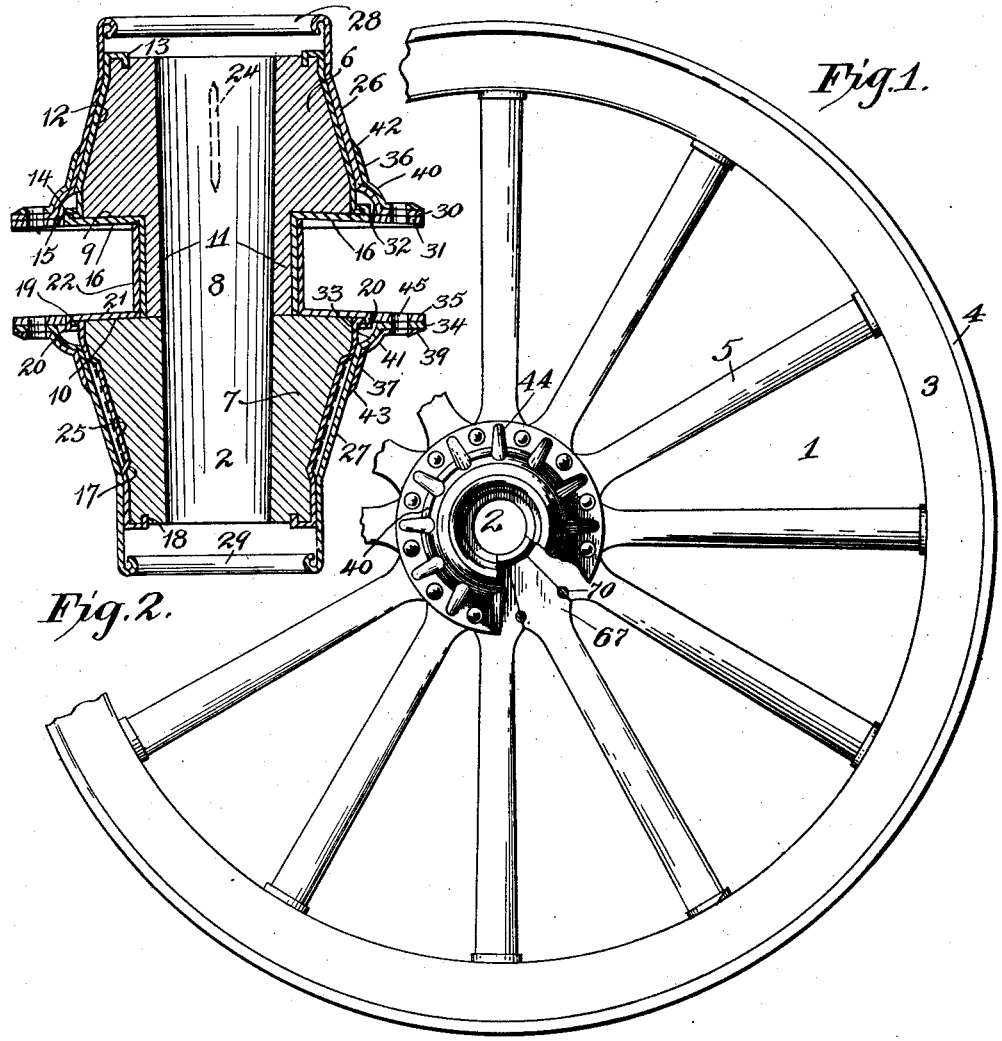

UNITED STATES PATENT OFFICE.

JOHN R. WELCH, OF ALEXANDRIA, INDIANA.

WHEEL.

1,100,800.  Specification of Letters Patent.  Patented June 23, 1914.

Application filed September 26, 1908. Serial No. 454,897.

*To all whom it may concern:*

Be it known that I, JOHN R. WELCH, a citizen of the United States, residing at Alexandria, in the county of Madison and State of Indiana, have invented a certain new and useful Improvement in Wheels, of which the following is a full, clear, and exact description, reference being had to the accompanying drawings.

This invention relates to vehicle wheels that are composed mainly of sheet metal, and has for its general objects to provide a wheel of this character which is light and strong; which, while being made of a number of parts, may be conveniently assembled and disassembled; and which shall be relatively economical of construction and yet durable in operation.

Generally speaking the invention may be defined as consisting of the combinations of elements embodied in the claims hereto annexed and illustrated, in one form, in the drawings forming a part hereof, wherein—

Figure 1 represents a front elevation of such wheel, parts being broken away to reveal the construction of the hub, rim and spoke ends; Fig. 2 represents a longitudinal sectional view taken through the hub of my wheel.

Describing the parts by reference characters, 1 denotes the wheel generally, the same comprising a hub 2, rim 3, tire 4, and spokes 5. The hub is composite, consisting of a body of wood or similar material inclosed in a plurality of metallic shells or casings. The body is made in two longitudinal separable parts 6 and 7, said body being provided with a symmetrical tapered bore 8 for the reception of a wheel box (not shown). The parts 6 and 7 are each provided with an abrupt shoulder 9 and 10 respectively, between which the annular spoke seat is formed, one of said shoulders being preferably provided with a cylindrical projection 11 which extends to and abuts against the shoulder on the other part.

As will appear more particularly from Fig. 2, the shoulders 9 and 10 are not at right angles to the length or bore of the hub, but form with the forwardly projecting portion thereof an angle of a little less than 90 degrees, to give the wheel the desired "dish," such dish being somewhat exaggerated, for the purpose of illustration, in Fig. 2. The wooden body of the hub, as previously stated, is inclosed in a plurality of metallic shells, namely, an inner shell and an outer shell. The inner shell comprises generally a front and a rear tapered member adapted to fit respectively the exterior of the front and the exterior of the rear wooden body described above, with telescoping metallic spoke-flanges connecting said shells and locked thereto. The rear shell member 12 is provided at its rear end with an inwardly projecting flange 13 pressed into a recess or groove in the rear end of the wooden body. The shell member 12 extends forwardly as far as the shoulder 9 and is there provided with an outwardly projecting flange 14 which is interlocked with a U-shaped flange 15 formed on the outer periphery of the spoke flange 16. The other shell member 17 is provided at its front with an inwardly projecting flange 18 which is pressed into a groove in the front end of the wooden body portion 7 and has at its inner end an outwardly projecting flange 19 which is interlocked with the U-shaped flange 20 formed on the outer periphery of the other spoke flange 21. The flanges 14 and 15 and 19 and 20 are interlocked by the application of great pressure thereto. One of the spoke flanges, as 21, is provided with a sleeve forming a spoke seat 22, for the inner ends of the spokes, telescoping within which is a similar sleeve 23 formed on the other flange. The inner sleeve 23 fits snugly against the outer cylindrical surface of the body projection 11. To prevent rotation of the shell members 12 and 17 on the wooden body, each of said shell members is provided with a sufficient number of longitudinal projections 24 and 25 pressed therefrom and fitting in corresponding grooves in the outer surfaces of the body portions 6 and 7. If desired, the projections on one shell member may be staggered with respect to those on the other. Flanges 16 and 21 are inclined to fit the corresponding shoulders 9 and 10 and give the desired amount of "dish" to the wheel.

The inner shell, formed of members 12 and 17, is inclosed by means of an outer shell, said outer shell comprising a rear member 26 and a front member 27, said members being tapered so as to form a close fit with the corresponding shell members 12 and 17 and being extended therebeyond. The rear end of member 26 is rounded or bent upon itself to form a "false wire" as shown at 28, and the front end of member 27 is correspondingly rounded, as shown at 29. The ends 28 and 29 will not flatten or bend and will effectively withstand all ordinary incidents of use. The shell member 26 is provided with an outwardly projecting flange 30 corresponding in inclination to the inclination of the flange 16. A ring 31 is applied to the front face of the flange 30 with its inner edge resting against the flange 15 and forming a continuation of the spoke flange 16. The junction between the tapered body of member 26 and the flange 30 is pressed outwardly to form a bead 32, which not only surrounds the joint formed between the shell member 12 and the flange 16 but also strengthens the outer shell or casing at this point. The front casing member 27 is provided in like manner with an outwardly projecting bead 33 and an outwardly projecting flange 34 to which there is applied a ring 35, similar to ring 31, resting against the flange 20.

36 and 37 denote angular rings which are fitted to the members 26 and 27 in the vicinity of the junction of the flanges 30 and 34 with the bodies of said members. The rings 36 and 37 are provided each with an outwardly projecting flange 38, 39, respectively, abutting against the flanges 30 and 34, respectively, and each is also provided with an outwardly projecting bead 40, 41, fitting the beads 32 and 33 respectively. Each ring has also an inclined portion 42, 43 fitting the corresponding inclined surfaces of the casing members 26 and 27, respectively. For strengthening purposes, the rings last described are each provided with corrugations 44. Flanges 30, 34, 38, 39 and the rings 31 and 35 are provided with apertures extending therethrough, as shown at 45, for the reception of the bolts by means of which the inner ends of the spokes are held in place and the spoke flanges are secured together.

The inner ends of the spokes are preferably flanged as at 67 and made in segmental shape adapted to form a substantially complete circle about the spoke recess. The adjacent sides of the inner ends of these spokes are formed with registering semi-circular recesses for the reception of bolts 70 which pass through the flanges 30, 34, 38 and 39 and rings 31 and 35 locking all the parts firmly together. Any suitable kind of rim may be employed and the outer ends of the spokes secured thereto in any convenient manner. In the wheel illustrated herein the rim is formed as a hollow metallic tube substantially rectangular in cross section and formed with registering radial recesses in its inner and outer faces. The metal surrounding the recess on the inner face is preferably punched outwardly so as to form a flange 47ᵃ adapted to receive a similarly shaped portion 49 formed upon the spoke. The end of the spoke is formed with a reduced tenon 50 formed with an enlargement 53 which seats in the recess 48 formed at the outside of the rim. The engagement between the spoke and rim is also strengthened by means of a flange 52.

This hub is particularly strong and durable and is comparatively easily assembled and disassembled. Owing to the dishing which is given to the hub, it is a comparatively simple matter to replace a broken or injured spoke with a new one. For this purpose, it is only necessary to withdraw the bolts 70 and drive off the rear end of the hub (parts 6, 12, 26, 23, 9, 36 and 31). Thereupon the injured or broken spoke may be withdrawn, the dished shape of the wheel permitting the rotation of the spoke in such a manner as to free it from interference by the remaining spokes.

For convenience of description, I have referred to the portion of the hub which is nearest to the vehicle body as the "rear" portion and that portion which is remote from the body as the "front" portion. Also in the claims hereto annexed, for convenience of description I refer to the inner body of the hub as of wood, meaning thereby to cover analogous material, other than the iron or steel of which the other parts of the hub will be composed.

Having thus described my invention, I claim:

1. A hub comprising, in combination, an inner body having an annular recess for the spoke ends, an inner shell applied to said body and having a spoke flange at each side of said recess, a ring extending outwardly from each flange, and a pair of outer shell members each having an outwardly projecting flange adapted to engage one of said rings, said outwardly projecting flanges and rings having apertures for bolts.

2. A hub for vehicle wheels comprising in combination an inner body having a spoke recess and a shell therefor comprising two members, each member extending from an end of the hub to the spoke recess, a spoke-seat member interlocked with each of the former members at opposite sides of the recess, and an external shell comprising a pair of members each applied to one of the former shell members and each having an outwardly projecting flange adjacent to the spoke recess, the outwardly projecting flange being connected with the body portion of each member by an outwardly extending head.

3. A vehicle hub comprising in combination an inner body having a spoke recess, a shell on said body, said shell comprising a pair of members mounted on the body and each having adjacent to the spoke recess in the body an outwardly projecting flange, a pair of spoke seat members each having a flange interlocking with one of the former flanges, and an outer shell for the hub, said outer shell comprising a pair of sections mounted on the former shell sections and each having an outwardly projecting flange engaging the flange of one of said first-mentioned members and provided with an outwardly projecting bead covering the joint between a shell member and its spoke seat member.

4. A vehicle hub comprising in combination an inner body having a spoke recess, a shell on said body, said shell comprising a pair of members mounted on the body and each having adjacent to the spoke recess in the body a flange, a pair of spoke seat members each having a flange interlocking with one of the former flanges, and an outer shell for the hub, said outer shell comprising a pair of sections mounted on the former shell sections and each having an outwardly projecting flange and provided with an outwardly projecting bead covering the joint between a shell member and its spoke seat member.

5. A vehicle hub comprising a shell, said shell being provided with spaced outwardly projecting flanges and a pair of reinforcing rings for said shell each having a portion adapted to abut a flange and a portion adapted to bear against the body of the shell, and outwardly projecting corrugations connecting said portions.

6. A vehicle hub comprising a shell provided with spoke flanges, and a pair of reinforcing rings for said shell located on opposite sides of the flanges and each having a portion adapted to abut a flange and a portion adapted to bear against the body of the shell.

7. A vehicle hub comprising a body having a spoke recess, a shell comprising a pair of members applied to said body and each having within the spoke recess in said body a spoke flange member, a pair of outer shell members for the former members each having an outwardly projecting flange adjacent to said recess connected by an outwardly projecting bead with the body of its members, and a pair of angular rings, one for each of the outer shell members and adapted to be applied thereto at the junction of the flange and body portions thereof and each having an outwardly projecting bead conforming to the subjacent bead on the corresponding inner member.

In testimony whereof, I hereunto affix my signature in the presence of two witnesses.

JOHN R. WELCH.

Witnesses:
W. E. CARTER,
VERNON H. DAY.